(12) United States Patent
Yasuda et al.

(10) Patent No.: US 6,337,461 B1
(45) Date of Patent: Jan. 8, 2002

(54) AIRBAG COVER

(75) Inventors: Mitsuo Yasuda, Toyama (JP); Amen Kusumi, Limbricht (NL)

(73) Assignee: Sanko Gosei UK Ltd., Lancashire (GB)

( * ) Notice: Subject to any disclaimer, the term of this patent is extended or adjusted under 35 U.S.C. 154(b) by 0 days.

(21) Appl. No.: 09/403,190

(22) PCT Filed: Jul. 2, 1998

(86) PCT No.: PCT/GB98/01947

§ 371 Date: Oct. 19, 1999

§ 102(e) Date: Oct. 19, 1999

(87) PCT Pub. No.: WO99/01317

PCT Pub. Date: Jan. 14, 1999

(30) Foreign Application Priority Data

Jul. 3, 1997 (GB) .............................................. 9714114

(51) Int. Cl.$^7$ ...................... B60R 21/20; B23K 26/36; B23K 26/38

(52) U.S. Cl. ............................. 219/121.62; 219/121.69; 219/121.71

(58) Field of Search ....................... 219/121.62, 121.68, 219/121.69, 121.7, 121.71, 121.83

(56) References Cited

U.S. PATENT DOCUMENTS

| 3,909,582 A | | 9/1975 | Bowen ........................ 219/121 |
| 5,744,776 A | * | 4/1998 | Bauer ...................... 219/121.7 |
| 5,803,489 A | * | 9/1998 | Nusshor ................... 280/728.3 |
| 5,883,356 A | * | 3/1999 | Bauer et al. ........... 219/121.62 |
| 5,968,381 A | * | 10/1999 | Nusshor ................ 219/121.69 |

FOREIGN PATENT DOCUMENTS

| DE | 195 46 585 | 6/1997 |
| DE | 196 36 429 | 11/1997 |
| DE | 196 54 452 | 1/1998 |
| EP | 0 711 627 | 5/1996 |

OTHER PUBLICATIONS

"Integral Passenger Side Inflatable Restraint Door with Laser–Genereated Tear Seam", Research Disclosure, Dec. 1993, No. 356, Emsworth, GB.#jf139##

*Primary Examiner*—Samuel M. Heinrich
(74) *Attorney, Agent, or Firm*—Burns, Doane, Swecker & Mathis, L.L.P.

(57) ABSTRACT

An airbag cover and method is disclosed. The cover comprises a laminate formed from a thermoplastic substrate base layer, a foamed thermoplastic intermediate layer and a thermoplastic decorative foil layer, wherein a panel for permitting release of an airbag is outlined in the cover by laser cuts extending into the laminate from said base layer, said laser cuts having a substantially uniform depth into the laminate.

18 Claims, 14 Drawing Sheets

PITCH BETWEEN HOLE AND HOLE IS WIDE
(PITCH BETWEEN LASER SHOT AND LASER SHOT IS WIDE)

Fig.9

NON OVERLAPPING HOLES

Fig.10

OVERLAPPING HOLES

Fig.14

PITCH BETWEEN HOLE AND HOLE IS NARROW
(PITCH BETWEEN LASER SHOT AND LASER SHOT IS NARROW)

AIRBAG COVER

This invention relates to a cover for an air bag and to a method for producing the same.

Air bag safety systems are commonly fitted in new motor vehicles.

These systems comprise a cushion which is normally stored in a compartment in the steering column and which can be rapidly inflated. There may also be a passenger side air bag located in the dashboard or fascia. Airbags may also be stowed in the vehicle doors.

In the event of a crash, sensors detect the vehicle rapidly decelerating and cause the air bag to be rapidly inflated into the vehicle interior to cushion the occupants as they are thrown forward or sideways depending on the direction of impact.

The compartment or compartments containing the air bags are closed by a cover to protect the air bags from accidental or malicious tampering, and to prevent any object entering the airbag compartment which could become a dangerous projectile on deployment of the bag. It is important that the cover is able to withstand knocks and jolts inflicted upon it. In particular, it must comply with the relevant European or U.S. standard governing passenger impact. It is a further requirement that the cover must not shatter or become detached when forced open, as it may in such case be projected towards and injure the vehicle occupants.

One approach to the above problem is illustrated in EP-A-0363986 which describes an airbag housing in which the airbag deployment aperture is closed by a pair of moulded plastic doors. These doors are attached at one side to the fascia or dashboard by hinging portions, and are joined to each other by a frangible bridging piece. A disadvantage of this arrangement is that the doors, being separately constructed from the fascia, are visible from the interior of the vehicle.

A second approach to the problem is disclosed in WO 95/24328 in which a line of mechanical weakness is introduced from the rear of the cover. Such an arrangement allows the designer to construct the fascia to give the appearance of continuity. However, there are difficulties in implementing such an approach. For example, due to inherent limitations in the manufacturing process, the trim piece varies in thickness over its entire extent, making it difficult to provide the accurate and consistent line of weakness required for the trim piece to rupture reliably. Even if a conventional tool could be controlled well enough to remove a constant thickness of material to provide a line of weakness, that remaining is not of constant depth.

Such non-consistent thickness means that the trim piece will not tear reliably or evenly, so hindering the successful deployment of the air bag.

A further disadvantage of a moulded cover as described in EP-A-0363986 is that it must be subjected to a much greater force than a cover formed by cutting before the frangible portion ruptures and the doors open. In some cases, the manufacturing process causes the finish of the weakened portion of the trim piece to degrade over time, when viewed from the face side of the dashboard.

It is now proposed to produce an integrated air bag cover by using a laser beam to provide a line of mechanical weakness in a motor vehicle trim piece or panel. The cover is produced by a method comprising the steps of:

i) scoring the panel from its underside with a laser beam to form a line of mechanical weakness, and ii) maintaining a substantially constant thickness of intact material within said score line by monitoring the depth of penetration of the laser beam into the panel, or the thickness of material remaining in the score-line.

The trim piece may be a three layer laminate, but may equally be of different construction The trim piece may be formed in accordance with the method made known in European Patents Nos. 0466181 and 0480456, granted to Sumimoto Chemical Company, the disclosures of which are hereby incorporated by reference.

The trim piece may also be manufactured by a vacuum adhesive process. In such a process, a pre-vacuum formed pad (e.g. of PVC/thermoplastic polyolefin and polypropylene foam) is adhesively bonded to a polypropylene injection moulded part, and the combined laminate is subject to vacuum moulding to finally form a moulded laminate.

Preferably, the trim piece comprises a rigid substrate, a resilient intermediate layer, and a decorative foil, forming the outer layer.

More preferably, the trim piece comprises a thermoplastic polyalkylene substrate, a low density polyalkylene foam, and a polymer foil.

Conveniently, the substrate is polypropylene (hereinafter PP), the intermediate layer is foamed polypropylene, and the foil is an acrylonitrile butadiene-styrene/polyvinyl chloride copolymer (ABS/PVC COMPOSITE) or thermoplastic polyolefin (TPO). It is also envisaged that trim pieces may be made from layers of a single substance, such as a TPO, in successive layers of solid, foamed and foil materials so that the trim pieces can be readily recycled at the end of their useful lifetime.

The laser is preferably a carbon dioxide laser. Alternatively, an Nd:YAG, argon gas, diode, excimer or solid state laser may be used. Preferably, the laser emits a pulsed beam Conveniently, the thickness of the remaining uncut material is determined using a sensor located at the upper or face side of the panel, the panel or trim piece being disposed between the laser and the sensor. The laser scores the trim piece more accurately than mechanical cutting tools.

To determine the depth of the uncut material, the laser beam is made to penetrate the trim piece completely and impinge on the sensor which then informs a controlling computer to shut off the beam.

A timing device or a pulse counter measures the time or number of pulses taken to penetrate the trim piece, allowing the controller to ascertain the depth of cut and hence the thickness of the intact material within the score line.

Theoretically, a single microperforation is all that is necessary to establish a reference point for the remainder of the cut along the score line. However, in order to maintain close control in case of variations in the material or initial thickness of the panel, it is preferred to provide a series of microperforations spaced along the line of weakness. Once the number of pulses required to just penetrate the panel is determined, the computer controller adjusts the number of pulses to less than this number so that a layer of intact material of desired constant thickness remains in the trough of the score line.

The score line formed by the laser need not be continuous. It may comprise a series of aligned holes separated by uncut material. The holes will generally be 'blind'. In other words, they will not entirely penetrate the thickness of the cover or trim piece. As described above, the score line will preferably have one or more microperforations extending through the entire thickness of the laminate forming the cover, which are followed by a series of blind holes formed by the laser. In a typical laminate comprising a base layer, foamed intermediate layer and outer foil layer, the blind holes will generally penetrate the entire depth of the base layer. Commonly, they will also penetrate the entire thickness of the foam layer.

In order to vary the degree of mechanical weakness imparted by the lasercutting operation, the pitch, i.e. the distance between blind holes, may be varied so that if less weakening is required, e.g. at a hinge portion, or with a thinner laminate, the pitch can be increased.

The laser may also be used to etch a design or wording on the top surface of the trim piece. For example, the word "Airbag" may be etched.

The present invention will now be described with reference to the accompanying drawings, in which.

Figure 1:
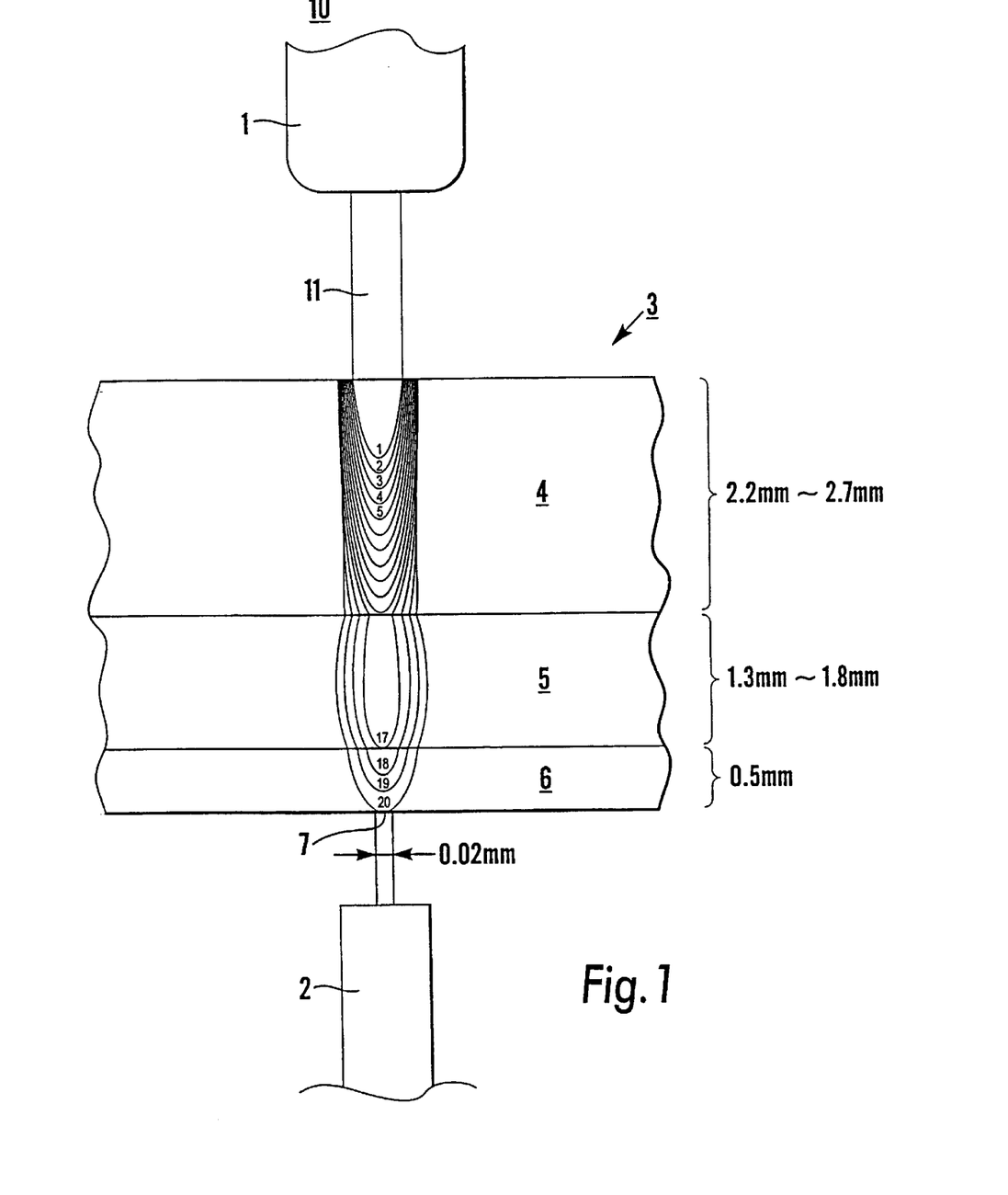
FIG. 1 shows a laser beam microperforating a motor vehicle trim piece.
Figure 2:
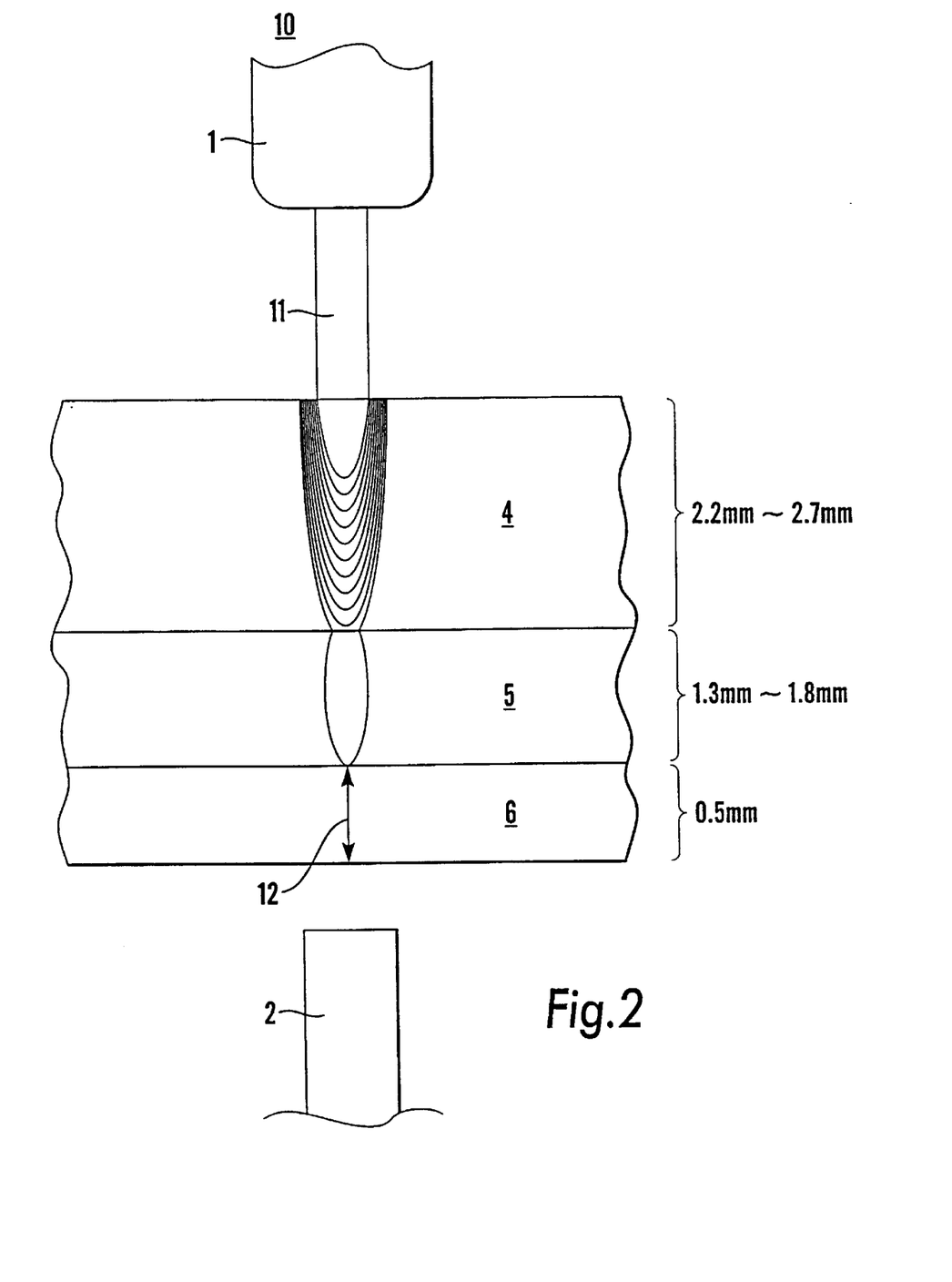
FIG. 2 shows a laser beam scoring a motor vehicle trim piece.

Referring to FIG. 1, the cutting head (1) of a laser beam generating means (10) is shown mounted opposite a sensor (2), with a trim piece or panel (3) disposed therebetween.

The trim piece (3) may consist of a rigid polypropylene substrate (4) bonded to a foamed polypropylene intermediate layer (5) which is covered by an ABS/PVC composite foil (6).

According to a preferred embodiment of the invention, the laser beam generating means (10) emits a pulsed laser beam (11) at the substrate layer (4). The laser beam (11) is infrared light of 10.6 μm wavelength focused to a diameter of 0.1–1.0 mm, preferably 0.2–0.5 mm. The design of the laser cavity is such that the beam has a Gaussian mode structure. Pulses of laser energy irradiate the trim piece (3), removing material in discrete portions primarily by a melt shearing mechanism, although vaporisation and chemical degradation of the material also contributes to the removal of material. When the laser beam (11) completely penetrates the trim piece (3), it impinges the sensor (2) which informs the system controller (20) (see FIG. 8). This establishes a reference point to control the depth of cut and, in particular, the thickness of material remaining in the trough of the score line. The laser beam has a Gaussian mode structure to ensure that the beam (11) microperforates the trim piece (3).

The microperforations (7) have a diameter of about 20 μm, too small to detect with the naked eye.

Microperforations (7) are made every 0.2–5.0 mm, preferably at intervals of about 0.5 to 0.8 mm along a predetermined cut path. Less frequent microperforation can adversely affect the tearing performance of the trim piece (3). This spacing also allows the thickness (12) of the intact material to be interpolated with sufficient accuracy. By using the microperforations as reference points, the laser beam can be controlled by the number or duration of laser pulses to maintain the thickness (12) substantially constant. It has been found that the invention is best performed by spacing the microperforations 0.3 to 0.9 mm apart, especially about 0.5 mm.

Figure 3:
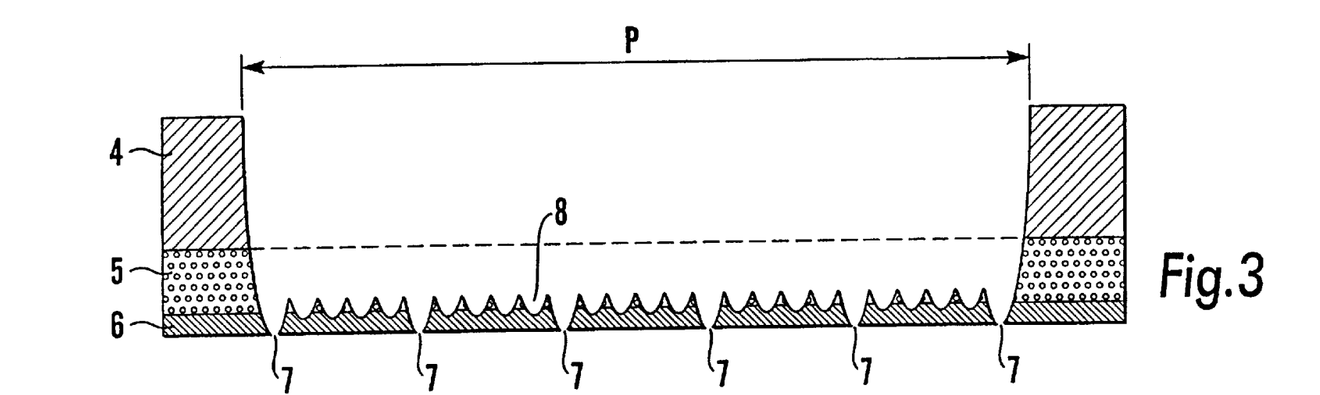
FIG. 3 shows a scoring pattern according to a preferred embodiment of the invention.

Referring to FIG. 3, the trim piece (3) is scored by moving the laser beam (11) along the path (P) in a stepwise manner or, alternatively, moving the trim piece with respect to the laser. The laser (10) emits a number of pulses sufficient to score, but not to penetrate, the foil (6) at points between the microperforations.

The score lines (8) are preferably an overlapping series of cuts as illustrated in FIG. 3.

Figure 4:
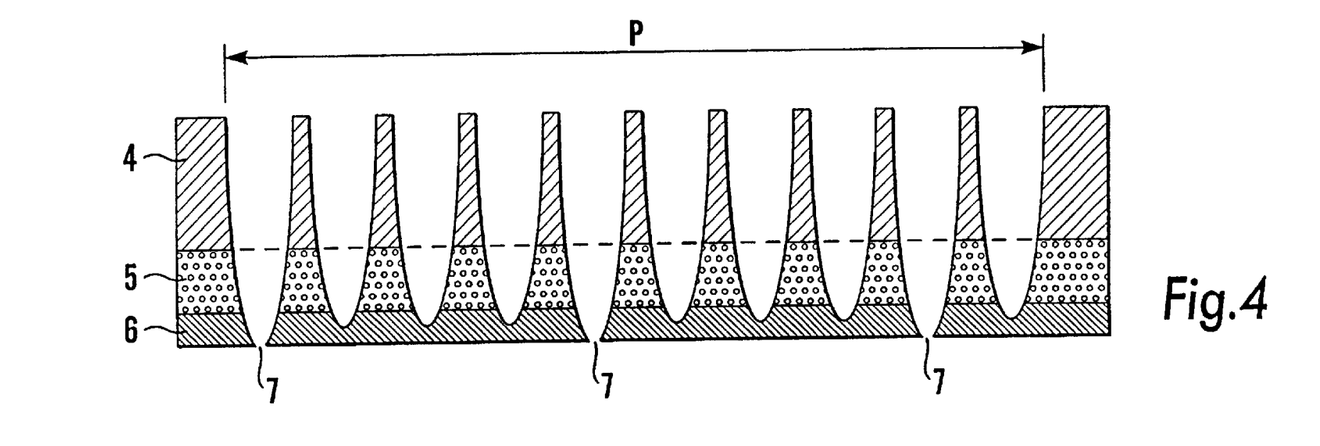
FIG. 4 shows a scoring pattern according to an alternative embodiment of the invention.

Alternatively, the score lines may be formed by a series of non-overlapping cuts as shown in FIG. 4.

Preferably, in the areas between the microperforations the laser beam (11) completely penetrates the substrate (4) and intermediate layer (5) and stops at the junction between the intermediate layer and foil or partially penetrates the foil (6). Preferably, a 50–500 μm depth of material is left intact between the microperforation points.

Figure 5:
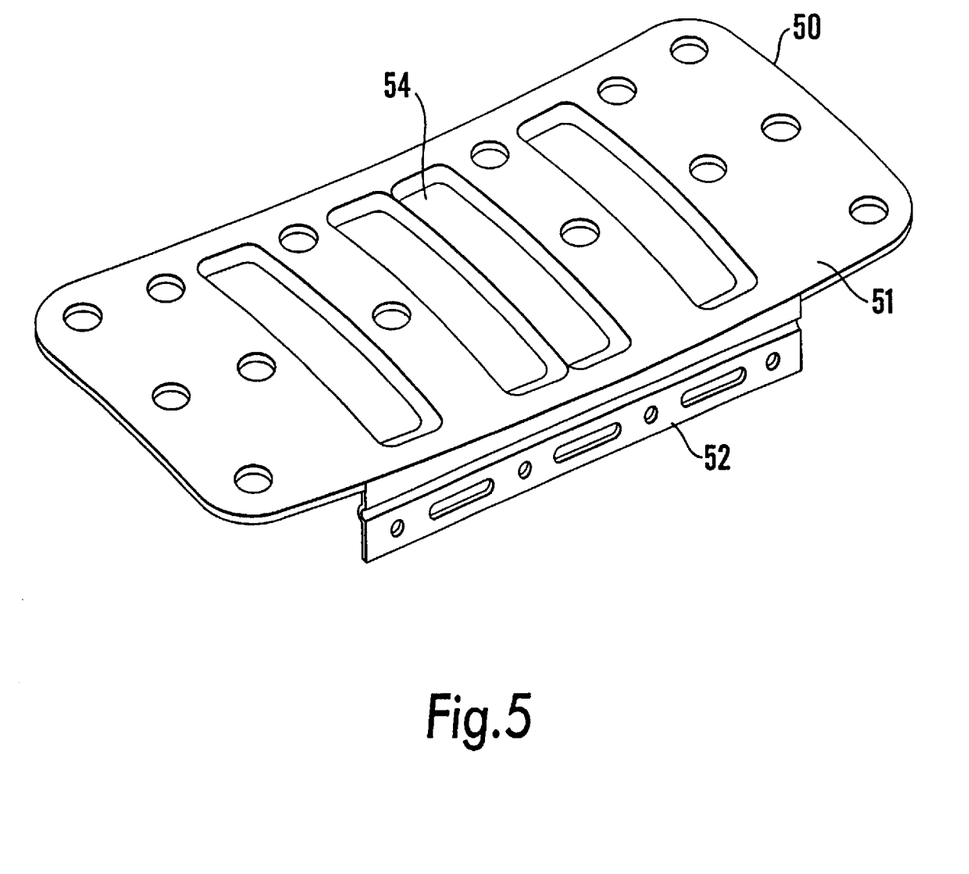
FIG. 5 shows a back plate for reinforcing an air bag cover.
Figure 6:
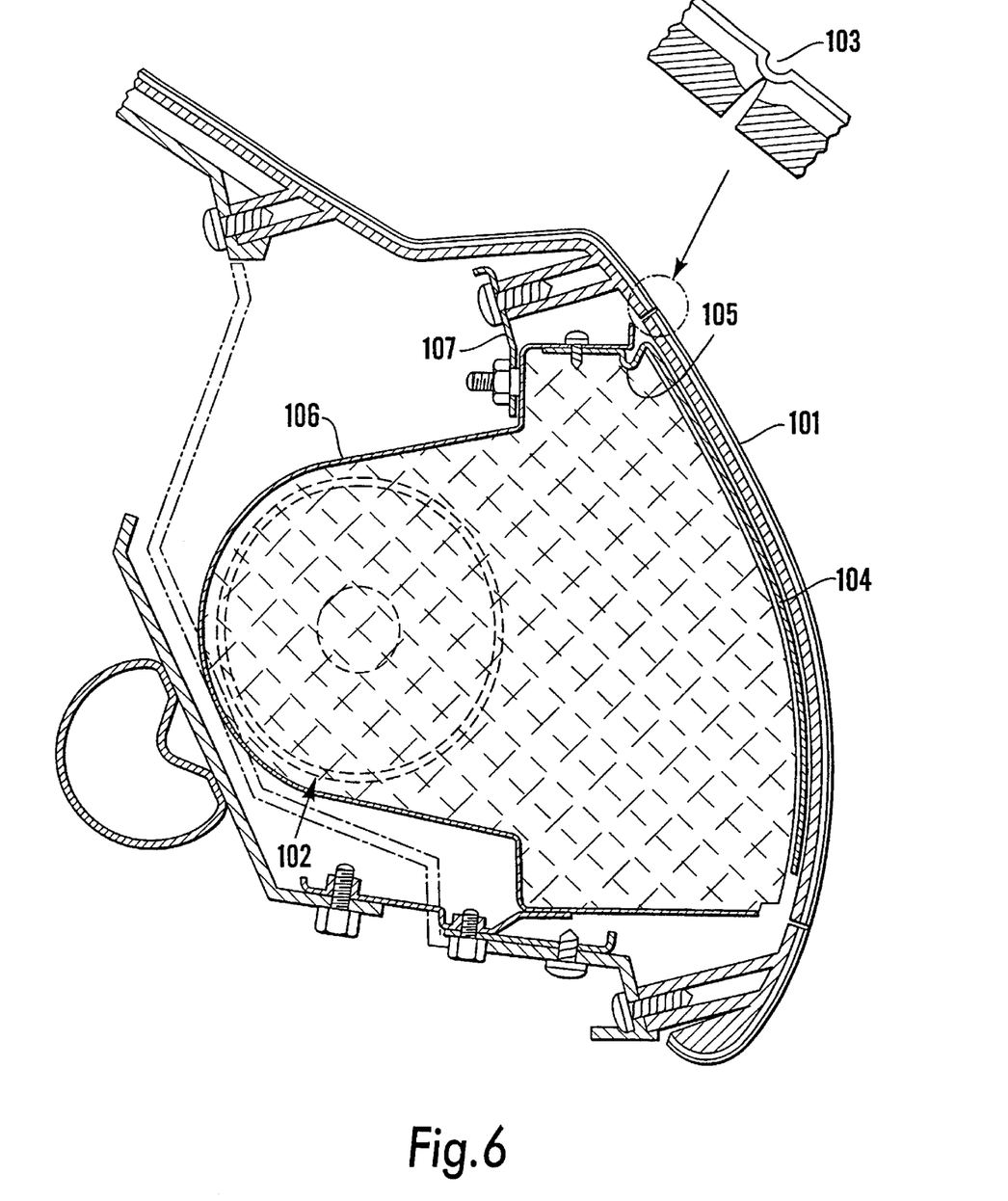
FIG. 6 shows a section through an instrument panel having an integrated air bag cover in accordance with the invention.
Figure 7:
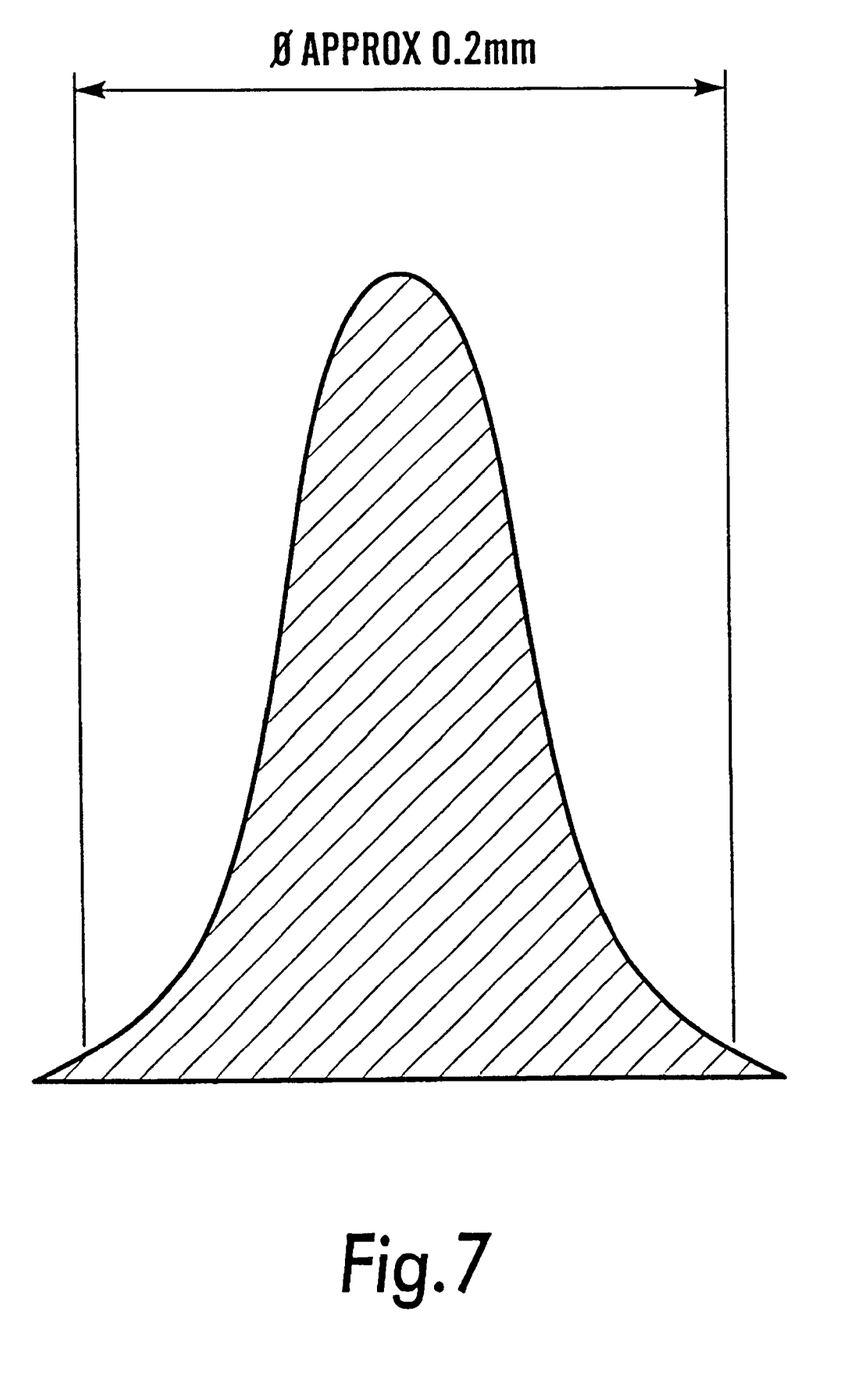
FIG. 7 shows the mode structure of the laser beam.

Referring to FIGS. 5 and 6, in one preferred embodiment of the invention, a metal back plate (50) is provided to reinforce the air bag cover. The metal plate may be of any suitable metal, e.g. aluminium, an aluminium alloy or steel.

The plate (50) consists of a panel (51) substantially the same size and shape as the air bag cover, and a wing (52) forming a hinge adapted to be secured to the dashboard or steering column.

The panel (51) may be provided with apertures (54) to reduce its weight, thereby not unduly increasing the force the inflating air bag must exert to open the cover.

FIG. 6 shows a section through the instrument panel and air bag compartment. The dashboard 101 is formed from a solid PP/PP foam/PVC laminate as shown in the detail sketch and is laser cut around four sides to define a panel large enough to provide a hatch through which the air bag 102 may be deployed. The outline of the panel may be invisible from the face side of the dashboard. Alternatively, the dashboard may be formed with a narrow groove 103 as shown in the detail sketch. This can be used as a styling feature and will hide any shadow of the laser cut, which may appear on ageing after some years use of the vehicle. Behind the panel 101, a metal backing plate (e.g. an aluminium or aluminium alloy plate) 104 may be provided. Plate 104 is hingeable or bendable at one side 105 and may or may not be attached to the panel 101. As shown in FIG. 6, plate 104 is attached to the air bag module 106 which is itself fastened by a strap 107 to the body of the instrument panel. The purpose of the plate 104 and its connection to the instrument panel is to ensure that the dashboard will comply with European (or other standards) covering resistance to impact on the face side of the dashboard. Instead of being attached to the aluminium plate 104, the panel 101 may be secured at a hinge side to the dashboard by fabric, e.g. nylon strips which are fastened to the panel and dashboard, e.g. by screws, heat stacking or adhesive.

Figure 8:
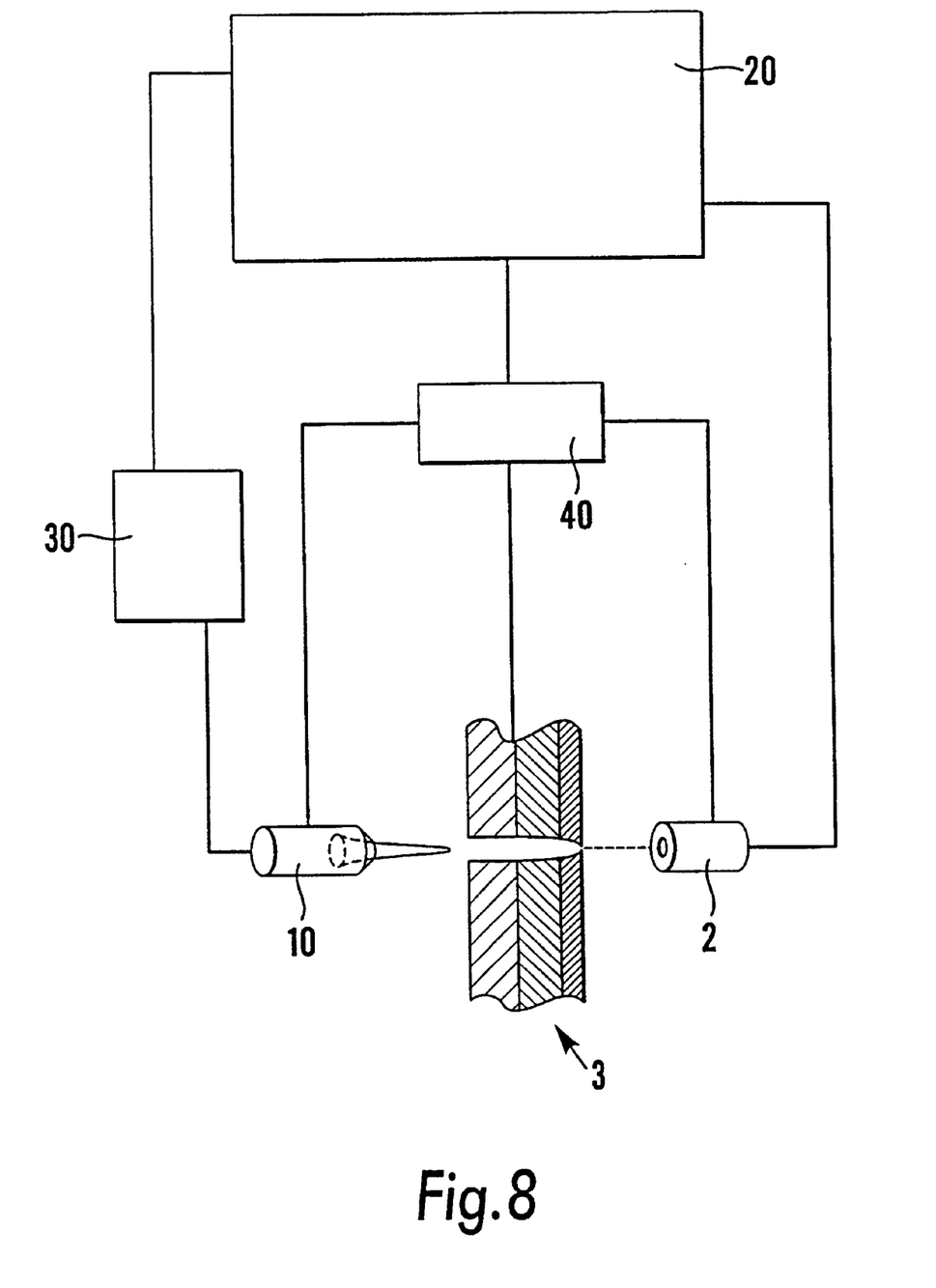
FIG. 8 shows schematically the scoring pattern controlling system.

FIG. 8 shows the relative arrangement of the apparatus required to perform the invention.

A laser beam generating means (10) is linked to a system controller (20) via a laser controller (30), which can vary the output of the laser. The laser beam generating means (10) is fixed relative to, and faces a sensor (2), which provides feedback signals to the system controller (20). A positioning means (40), driven by the system controller (20) is connected to the laser beam generating means (10) and sensor (2) or to the trim piece (3).

Figure 9:
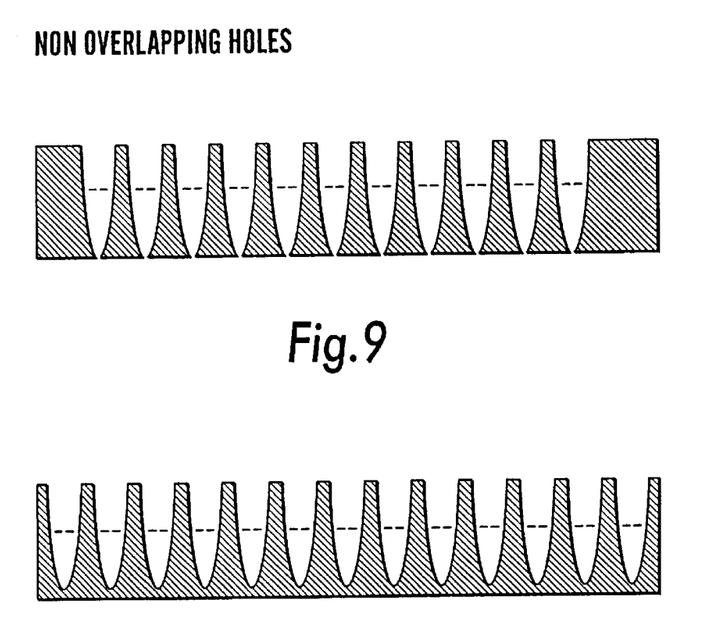
FIGS. 9 and 10 illustrate a pattern of laser cuts.
Figure 10:
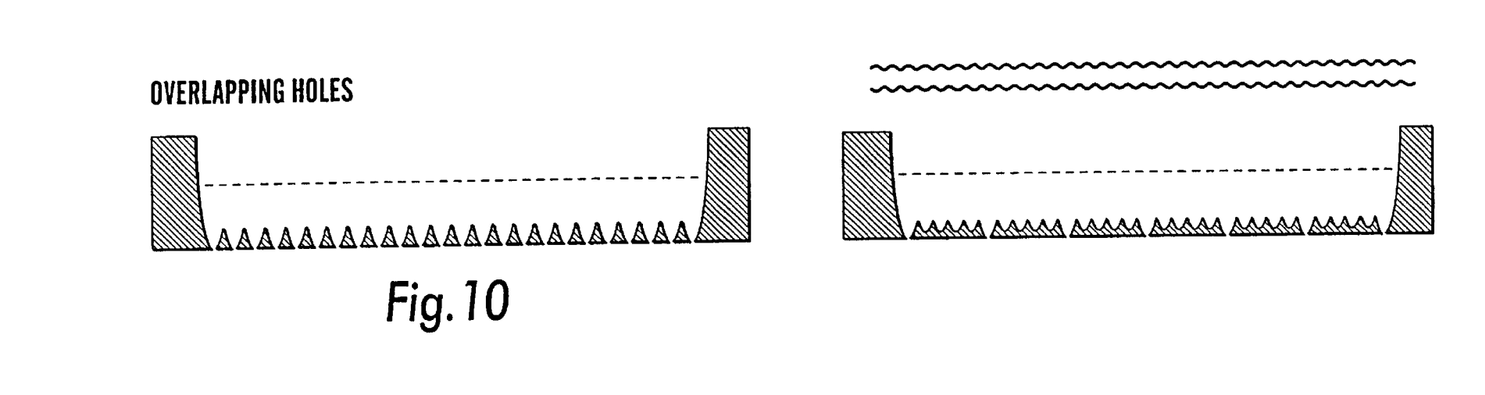

Various other patterns of cuts may be formed in the panel or trim piece. FIGS. 9 and 10 both show score lines formed by a series of continuous microperforations. In FIG. 9, the perforations are non-overlapping, but in FIG. 10, the holes are overlapping and a score line of essentially constant depth has been formed. In a mass production process, it may be desirable to introduce a further step whereby the pattern of microperforations may be inspected.

Figure 11:
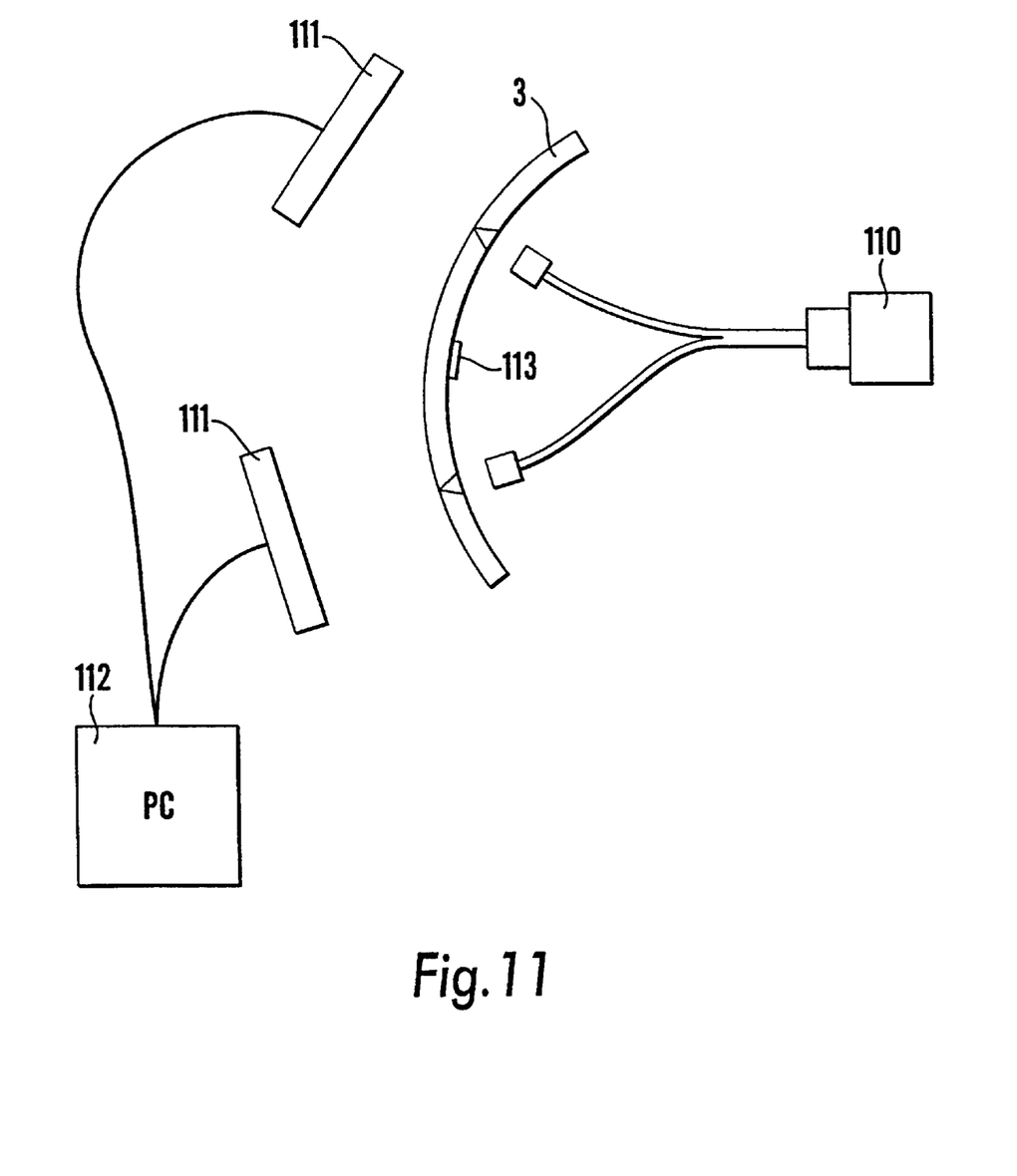
FIG. 11 is a schematic view of equipment for inspection and monitoring of the number and pattern of microperforations from the face side of the trim piece.
Figure 12:
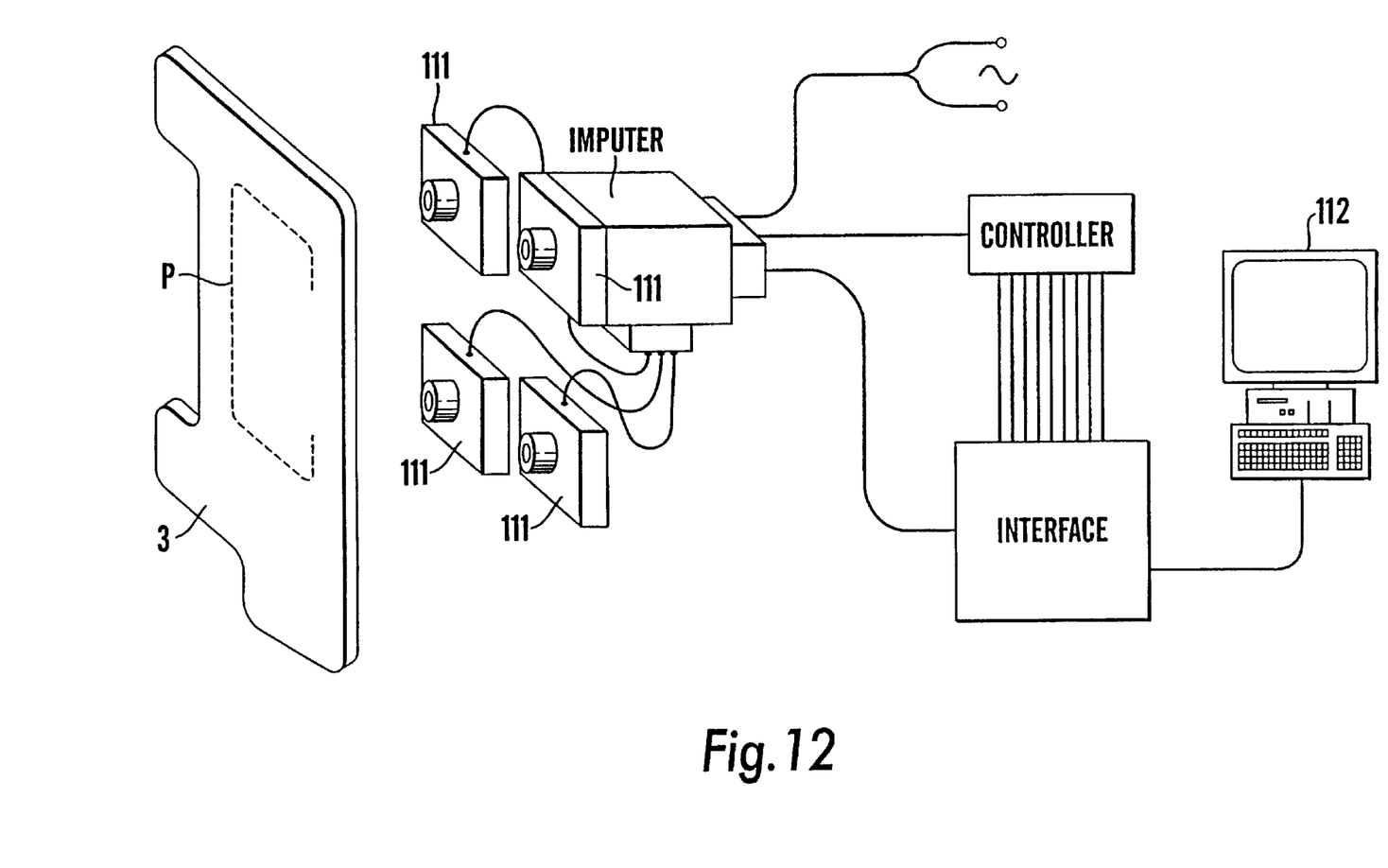
FIG. 12 is a schematic view of an alternative layout of inspection and monitoring equipment.

FIGS. 11 and 12 show one inspection method which may be utilised.

In FIG. 11, the trim piece (3) is illuminated on one face by a light source (110). Suitable photoreceptive sensors (111) are directed at the opposite face. Light travelling through the microperforations strikes the sensors which relay this information to a computer (112) programmed to assess the number and spacing of the microperforations. This pattern can then be checked against the desired pattern and stored details of permitted tolerances, and a pass/fail decision made on the basis of predetermined tolerance limits. Each piece may carry a bar code to uniquely identify each trim piece.

FIG. 12 shows another similar arrangement of the inspection system and the same reference numerals have been used to identify corresponding components.

Figure 13:
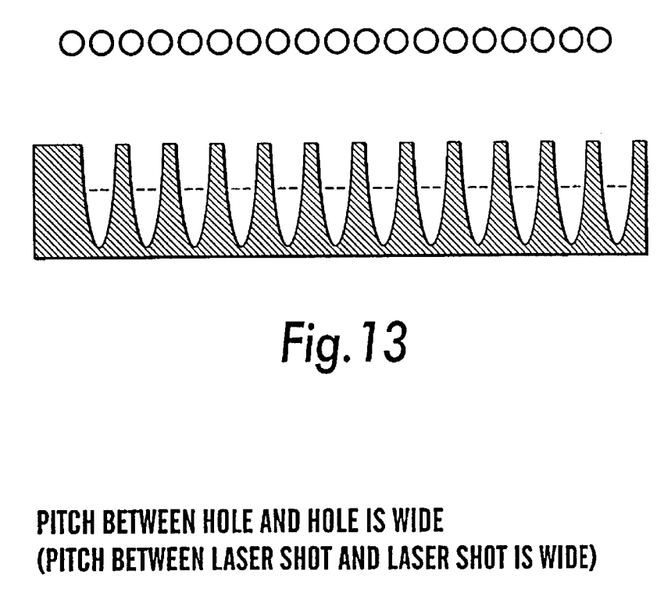
FIGS. 13 and 14 illustrate an alternative pattern of laser cuts in which no microperforations are formed.
Figure 14:
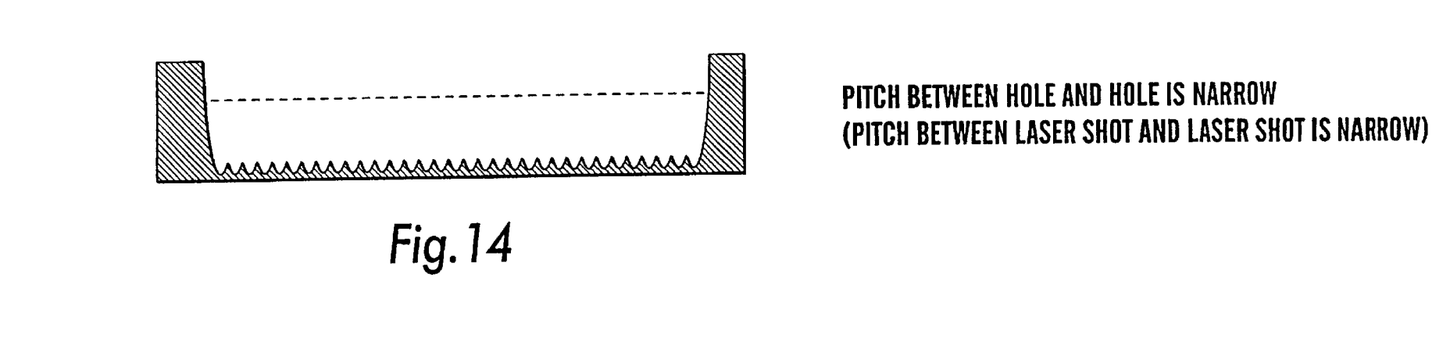

FIGS. 13 and 14 show a further variation in which no microperforations are formed. In the case of FIG. 13, a series of contiguous holes have been formed leaving residual material in each trough which is substantially constant along the score line. A single microperforation at the beginning of the cut could be used as a reference point.

FIG. 14 shows a pattern similar to FIG. 13, except that the holes are overlapped, thus creating a substantially continuous cut.

Preferably, the control of the depth and pattern of cut is achieved by counting the laser pulses. Using a microperforation (i.e. where the tip of the laser just penetrates the foil), the number of pulses are counted which just cause penetration of the panel with the tip of the laser. Preferably, the laser is tuned to provide a large number of short pulses, e.g. 15 to 25 pulses, usually about 20. The portions between the microperforations can then be cut by reducing the number of pulses of the same energy level so that penetration does not occur. In the case of a laminate having a foamed interior, it is found that if the laser reaches the foamed portion, it will burn a hole up to the junction with the adjacent solid layer, e.g. the outer foil, which is generally satisfactory in the case of a solid thermoplastic/thermoplastic foam/thermoplastic foil laminate.

In the case of some laminates, the outermost layer may be transparent to laser light of certain wavelengths and where this is used, it may not be necessary to penetrate the outermost layer at all.

While the same pattern of cuts may be made around all four sides of the cover, it may be advantageous to weaken only three adjacent sides, and leave the fourth 'hinge' side, uncut. Alternatively, the hinge side may be weakened to a lesser extent, e.g. by reducing the depth of penetration or leaving uncut gaps between weakened portions.

Figure 15:
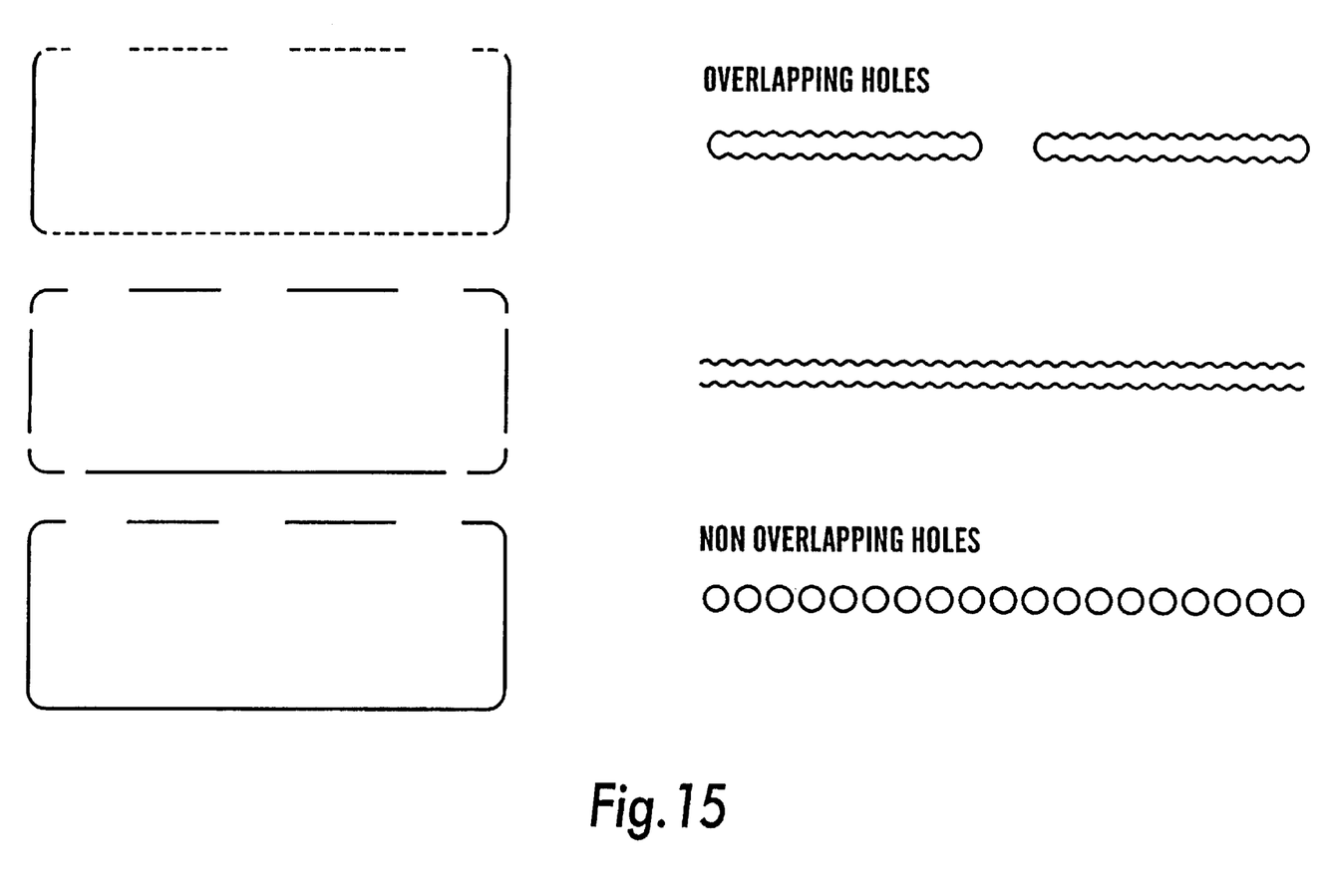
FIG. 15 shows a number of panel cuts in plan view.

FIG. 15 shows a number of panel cuts as seen in plan view. It can be seen that the score lines may be incomplete on one side. This will enable the side with an incomplete score line to act as a hinge.

Figure 17:
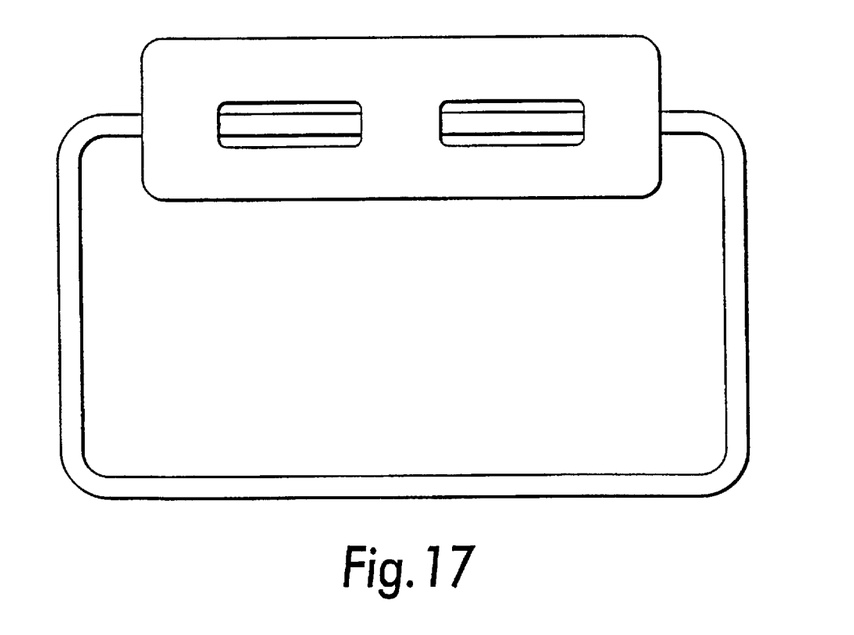
Figure 17A:
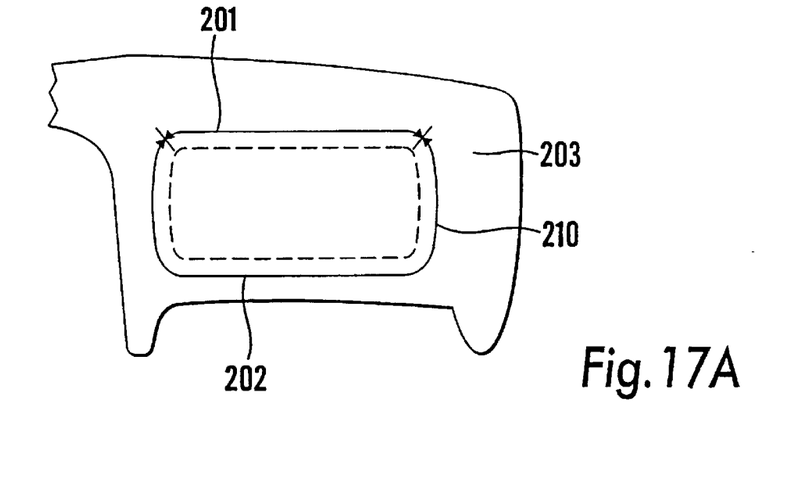
FIG. 17A shows in plan view the outline of a hingeable airbag lid in a cover comprising a dashboard assembly.
Figure 17B:
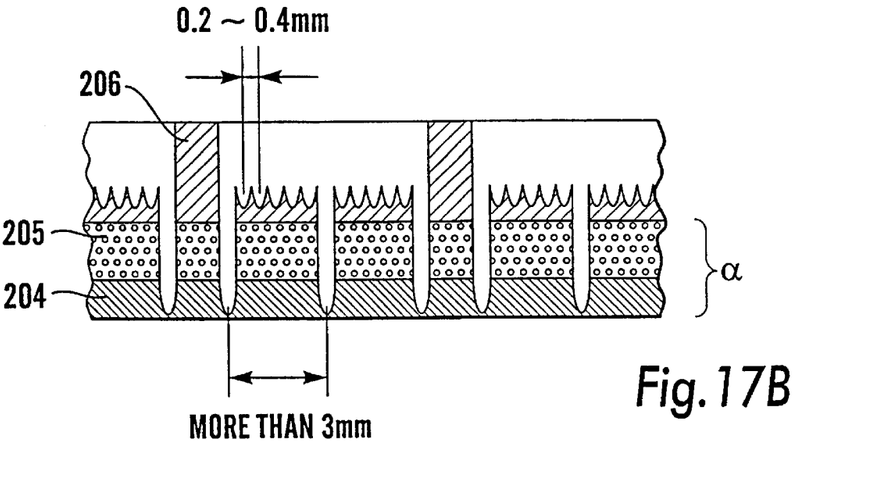
FIG. 17B is a section of the dashboard assembly of FIG. 17A showing the structure of the hinge function area.
Figure 17C:
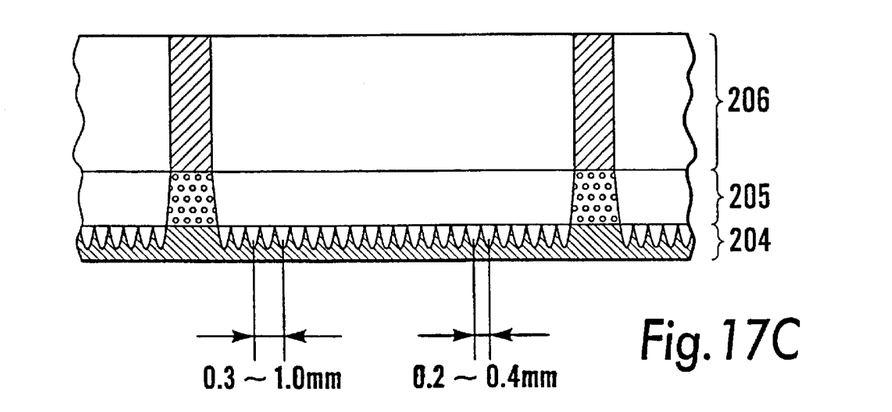
FIG. 17C is a similar section to that shown in FIG. 17B, but taken in the first opening area.

Different sequences and patterns of laser scoring can be used to define a hingeable dashboard. This is illustrated in FIGS. 17A, 17B and 17C. As can be seen from FIG. 17A, the air bag lid has a hinge function line 201 and a second line 202 which defines areas of greater weakness in the dashboard moulding 203. FIG. 17B shows a section through the hinge function line, and FIG. 17C shows a section along the line 202. It can be seen that a greater amount of intact material remains unscored by the laser in the hinge function area 201 compared with the first opening area 202. Thus, the hinge function line has a depth oc which includes all the cosmetic foil layer 204, all the foamed layer 205 and a portion of rigid backing layer 206. Also, the pitch between the microperforations may be more than about 3 mm.

In the case of the score lines 202, the amount of intact material is much less. Essentially all the rigid backing substrate 206 has been cut away, as well as the foam layer 205. Part of the cosmetic foil layer 204 may also be cut away. Also, the pitch between microperforations is much smaller, e.g. 0.3 to 1 mm. In both cases, the pitch between successive laser pulses may be 0.2 to 0.4 mm. The areas 210 which connect the line 202 to the hinge function area will be cut away in a similar fashion to the line 202. These measures ensure that when the air bag is activated, the lid will be severed first along the line 202 and the lid will hinge along the line 201.

Figure 16:
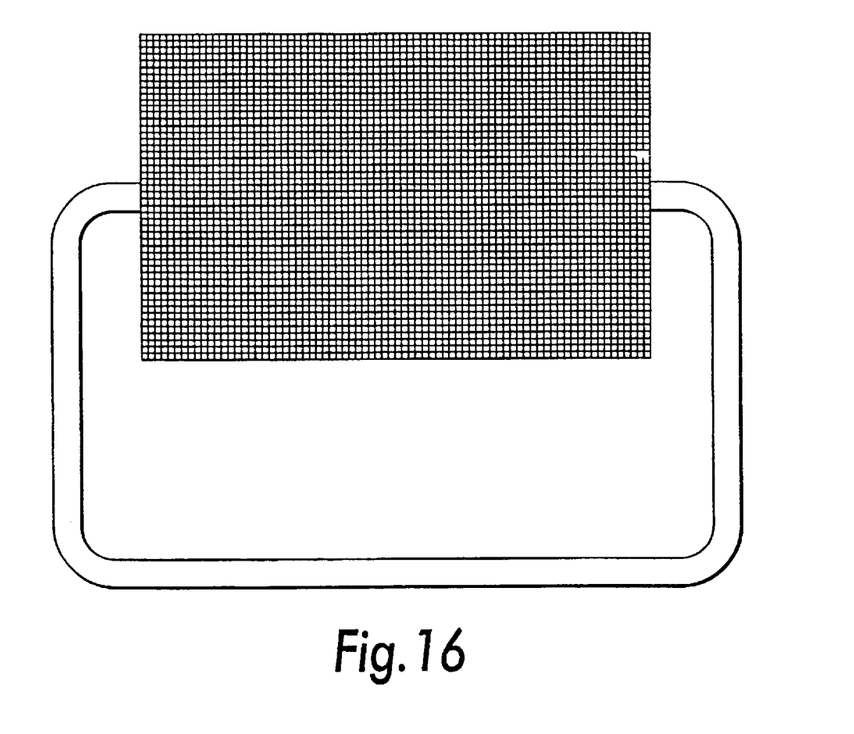
FIG. 16 and 17 show two alternative ways of providing a hinge along one side of the panel.

Additionally or alternatively, a hinge device may be provided on one side of the cover. Two possibilities are shown in FIGS. 16 and 17. In each case, a hinge is attached to the underside of the cover and the surrounding panel. In FIG. 16, the hinge is a polyamide grid or strap which may be attached to the underside of the cover and the panel by suitable means, e.g. by screws. As shown in FIG. 17, the hinge may consist of a metal construction and be attached, preferably by mechanical fixing, heat stacking or adhesive bonding to the cover and panel.

Although the invention has been described with reference to the type of air bag safety system generally fitted in road going motor vehicles, it is not intended to be so restricted. The skilled artisan will recognise that the teaching of this document is equally applicable to other vehicles and vessels, including aircraft, amphibious vehicles and boats.

What is claimed is:

1. A method of producing an air bag cover by using a laser to form a line of mechanical weakness in a motor vehicle trim piece or panel, said method comprising the steps of:
   i) scoring the trim piece from its underside with a laser beam to form a line of mechanical weakness, and
   ii) forming a plurality of microperforations along said line of mechanical weakness,
   iii) sensing the energy of the laser beam penetrating each microperforation and utilizing the microperforation as a calibration point to control the energy of the laser between sequential microperforations to thereby maintain a substantially constant thickness of intact material between microperforations along said line of mechanical weakness.

2. The method according to claim 1, wherein the trim piece is a laminate.

3. The method according to claim 1, wherein the trim piece comprises a polypropylene (PP) substrate, a foamed polypropylene (PP) intermediate layer, and an acrylonitrile-butadiene-styrene/polyvinyl chloride (ABS/PVC) composite or a thermoplastic polyolefin (TOP) foil.

4. The method according to claim 1, wherein the laser beam is of constant intensity.

5. The method according to claim 1, wherein the laser beam is pulsed.

6. The method according to claim 4, wherein the laser beam is moved along a predetermined score path in a stepwise manner.

7. The method according to claim 1, wherein the laser is a carbon dioxide gas laser.

8. The method according to claim 1, wherein microperforations are made every 0.2–5.0 mm along the predetermined score path.

9. The method according to claim 1, wherein a computer interpolates the thickness of material lying between adjacent microperforations and varies the laser beam accordingly.

10. The method according to claim 1, further comprising the step of reinforcing the air bag cover with a back plate.

11. The method according to claim 10, wherein the plate is aluminium.

12. The method according to claim 1, wherein the trim piece is for a steering wheel.

13. The method according to claim 1, wherein the trim piece is for a dashboard.

14. The method as claimed in claim 1, wherein a sensor is positioned on the opposite side of the trim piece or panel to the laser and said sensor is calibrated to utilize the energy of the laser beam detected at the microperforations as a reference point to control the thickness of uncut material along the score line between said microperforations and to maintain such thickness substantially constant.

15. The method as claimed in claim 14, wherein the panel is a laminate made up of a plurality of layers, the depth of penetration of the laser cut into the panel between the microperforations is controlled by counting the pulses required to form a microperforation and deducting a number of pulses calculated to stop at the junction between the final face side layer and the adjacent layer.

16. The method as claimed in claim 15, wherein the adjacent layer is a foamed plastics material and the final layer is a foil.

17. The method as claimed in claim 14, wherein the laser beam is operated to produce a series of microperforations spaced lengthwise of the score line.

18. The method as claimed in claim 14, wherein said score line is formed to outline the air bag cover and a hinge is provided on the underside of the panel between the outline of the cover and the panel so that, in use, the cover is severed from the panel along said score line but remains attached to the panel by said hinge.

* * * * *